(12) United States Patent
Reimer et al.

(10) Patent No.: US 7,272,971 B1
(45) Date of Patent: Sep. 25, 2007

(54) QUICK-CONNECT PRESSURE TEST SYSTEM

(76) Inventors: Cory Reimer, 154 Woodbury St. SW., New Prague, MN (US) 56071; Duane Reimer, 750-229th St. West, Jordan, MN (US) 55352; John Dorn, 7672 Mustang La., Lino Lakes, MN (US) 55014

( * ) Notice: Subject to any disclaimer, the term of this patent is extended or adjusted under 35 U.S.C. 154(b) by 113 days.

(21) Appl. No.: 11/244,704

(22) Filed: Oct. 6, 2005

(51) Int. Cl.
*G01M 3/08* (2006.01)
(52) U.S. Cl. .......................................... 73/46
(58) Field of Classification Search ................ 73/37, 73/49, 5, 46, 35.9, 756
See application file for complete search history.

(56) References Cited

U.S. PATENT DOCUMENTS

| 2,695,632 A | 11/1954 | Brock |
| 2,873,764 A | 2/1959 | Lombard et al |
| 2,886,067 A | 5/1959 | Maxwell et al. |
| 3,179,127 A | 4/1965 | Terry |
| 3,326,243 A | 6/1967 | Augustus |
| 3,884,070 A | 5/1975 | Windle |
| 4,385,643 A | 5/1983 | Noe |
| 4,887,646 A | 12/1989 | Groves |
| 5,899,234 A | 5/1999 | Senninger |
| 6,116,286 A | 9/2000 | Hooper et al. |
| 6,763,701 B1 | 7/2005 | Moretz |

OTHER PUBLICATIONS

John Guest, LTD; www.johnguest.com/part_spec_asp?s=STS_S1; Superseal Pipe Insert.

*Primary Examiner*—Andre J. Allen
(74) *Attorney, Agent, or Firm*—Christopher G. Frank; Larkin Hoffman Daly & Lindgren, Ltd.

(57) ABSTRACT

The present invention provides a quick-connect pressure test apparatus. The apparatus includes a test plug having a set of sealing rings extending around a sidewall thereof for fitting within an inner diameter of a pipe. The test plug has a first end having a receiving cavity in communication with a central lumen that extends through the test plug to a second end thereof. A retainer is configured to sit on an end section of the pipe, having a plurality of retaining arms flexibly extending about an outer diameter of the pipe. A slide compressor is configured to receive the retainer within a cylindrical cavity, urging the retaining arms to frictionally engage the outer diameter of the pipe and maintain the test plug within the pipe. A plug handle or, alternatively, a pressure coupler may be received in the receiving cavity of the test plug.

22 Claims, 7 Drawing Sheets

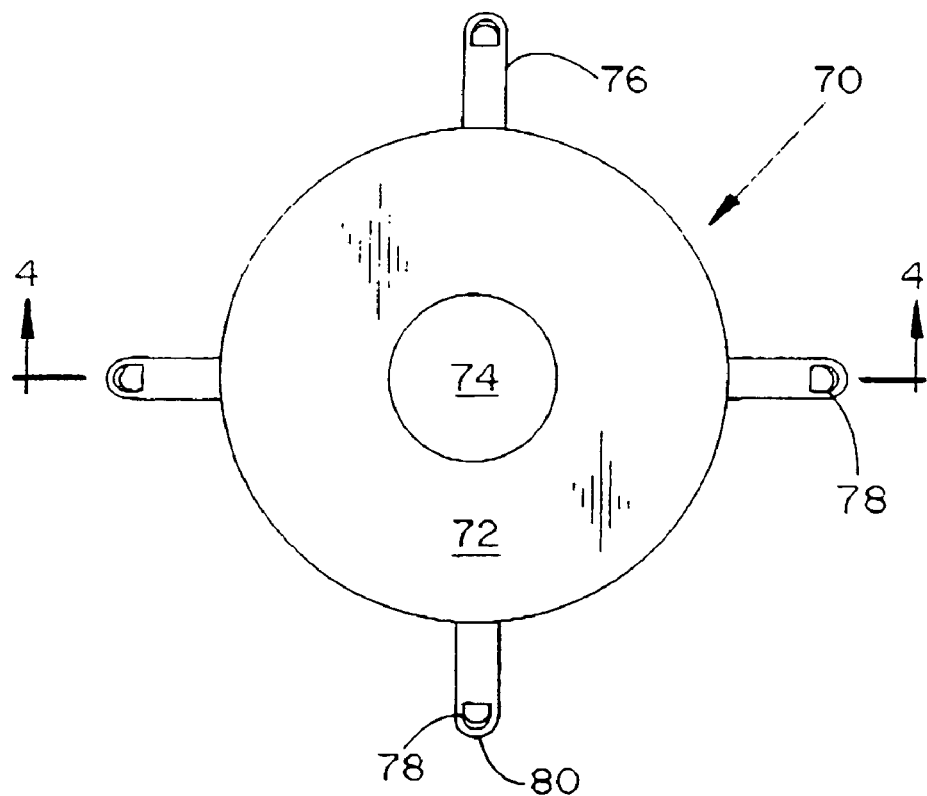
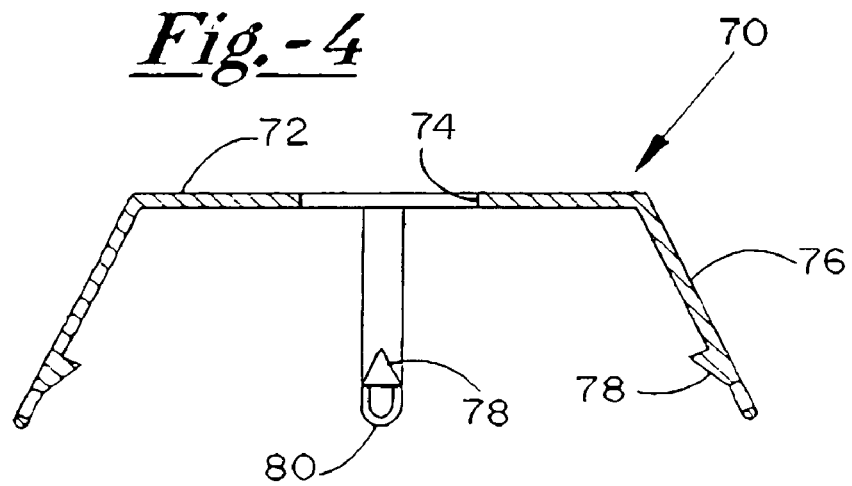

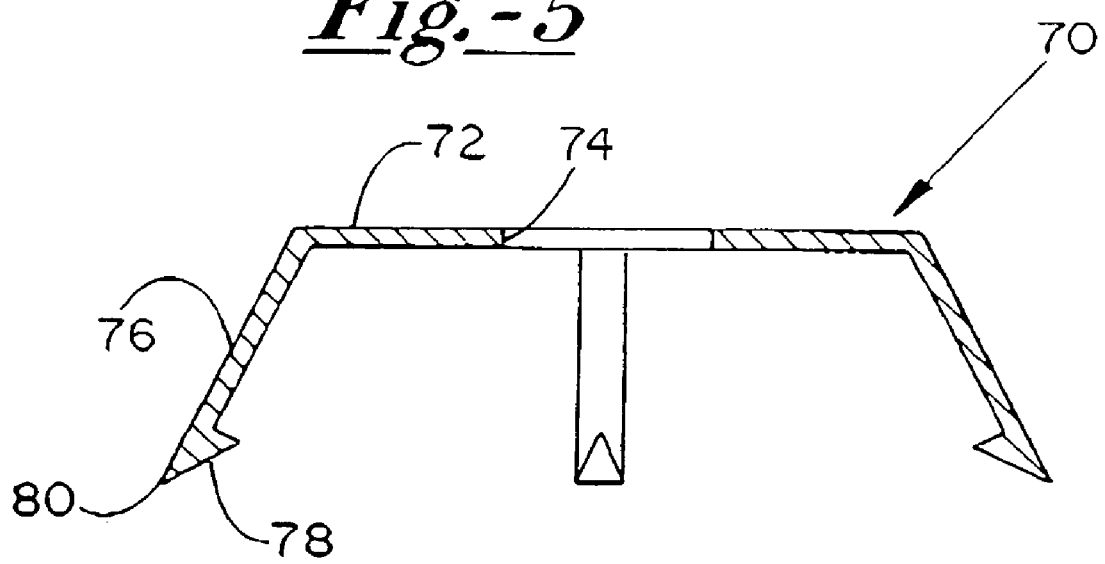

QUICK-CONNECT PRESSURE TEST SYSTEM

BACKGROUND OF THE INVENTION

1. Field of the Invention

The present invention relates generally to the field of quick-connect pressure test systems. More specifically, the present invention relates to a quick-connect device and method for pressure testing of a plumbing system and/or other such pipe systems.

2. Background of the Prior Art

Plumbing codes require that a newly installed plumbing system be pressure tested during rough-in inspections, and that a final plumbing pressure test be performed after the plumbing fixtures have been set in place.

Pressure testing is generally performed by sealing off the ends of the piping and tubing comprising the plumbing system. Sealing of the tubing is achieved through the use, for example, of a sweat cap on the end portion of a copper tubing or other such rigid piping or tubing. Sealing of more flexible tubing, such as cross linked polyethylene (PEX) tubing or PVC tubing, for example, requires that the end portion of the tubing be plugged on an inner diameter and a retainer be placed on an outer diameter of the tubing to maintain the plug in place.

Once pressure testing has been performed, it is common practice to unplug the tubing by cutting off the sealed end portion of the tubing and disposing of the sealed end portion as waste.

Such present methods of sealing and unsealing of the end portions of a pipe can be time consuming and result in a large amount of waste product. Another problem that exists with more flexible tubing is the need to straighten the tubing upon installation through a concrete poured flooring. Otherwise, the tubing may extend through the flooring at random angles with respect to the flooring, making it difficult to work with the tubing.

It would therefore be advantageous to provide a system and apparatus for temporarily sealing a pipe in a plumbing system that overcomes these and additional problems of the prior art.

SUMMARY OF THE INVENTION

The present invention provides a system and apparatus for temporarily sealing the end of a pipe for pressure testing thereof.

In one embodiment, an elongate straightening rod is configured to be received within an inner diameter of the pipe. A pair of sealing rings extend about a side wall of the elongate straightening rod to seal the space between the side wall of the elongate straightening rod and the inner diameter of the pipe. A first end section of the elongate straightening rod has a receiving cavity for selectively receiving a connecting sleeve of a plug handle or, alternatively, a pressure coupler. The receiving cavity is in communication with a lumen that extends from the first end section to an opposing second end section such that when a pressure coupler is received within the cavity, the pipe system may be pressurized via the lumen extending through the elongate straightening rod.

In an alternative embodiment, a plug is configured to be received within the inner diameter of the pipe. A pair of sealing rings extend around the plug to seal the space between the plug and the inner diameter of the pipe. A first end of the plug has a receiving cavity therein, in communication with a pressure lumen that extends from the first end of the plug to an opposing second end of the plug.

The present invention further provides a retainer in combination with a slide compressor to maintain the elongate straightening rod or plug within the inner diameter of the pipe during pressure testing thereof.

The retainer has a body configured to sit on the top lip of the pipe. The retainer body has a central aperture through which the connecting sleeve of the plug handle or pressure coupler is received. A plurality of retaining arms are flexibly suspended from the retainer body, about the outer diameter of the pipe.

The slide compressor has a body with a central aperture which receives the connecting sleeve of the plug handle or pressure coupler therethrough. A cylindrical side wall of the slide compressor defines a receiving cavity for receiving the retainer therein. As the slide compressor is advanced over the retainer and end section of the pipe, the retainer is received within the cavity of the slide compressor such that the retaining arms are urged into contact with the outer diameter of the pipe. The retaining arms frictionally engage the outer diameter of the pipe to maintain the positioning of the plug or elongate straightening rod within the pipe.

The various features and advantages of the various embodiments of the present invention are discussed in more detail in the following sections.

BRIEF DESCRIPTION OF THE DRAWINGS

FIG. 3 illustrates a top view of a retainer in accordance with an embodiment of the present invention.

FIG. 4 illustrates a side view of the retainer from FIG. 3.

FIG. 5 illustrates a side view of an alternative embodiment of a retainer in accordance with the present invention.

DETAILED DESCRIPTION OF THE PREFERRED EMBODIMENTS

Figure 1:
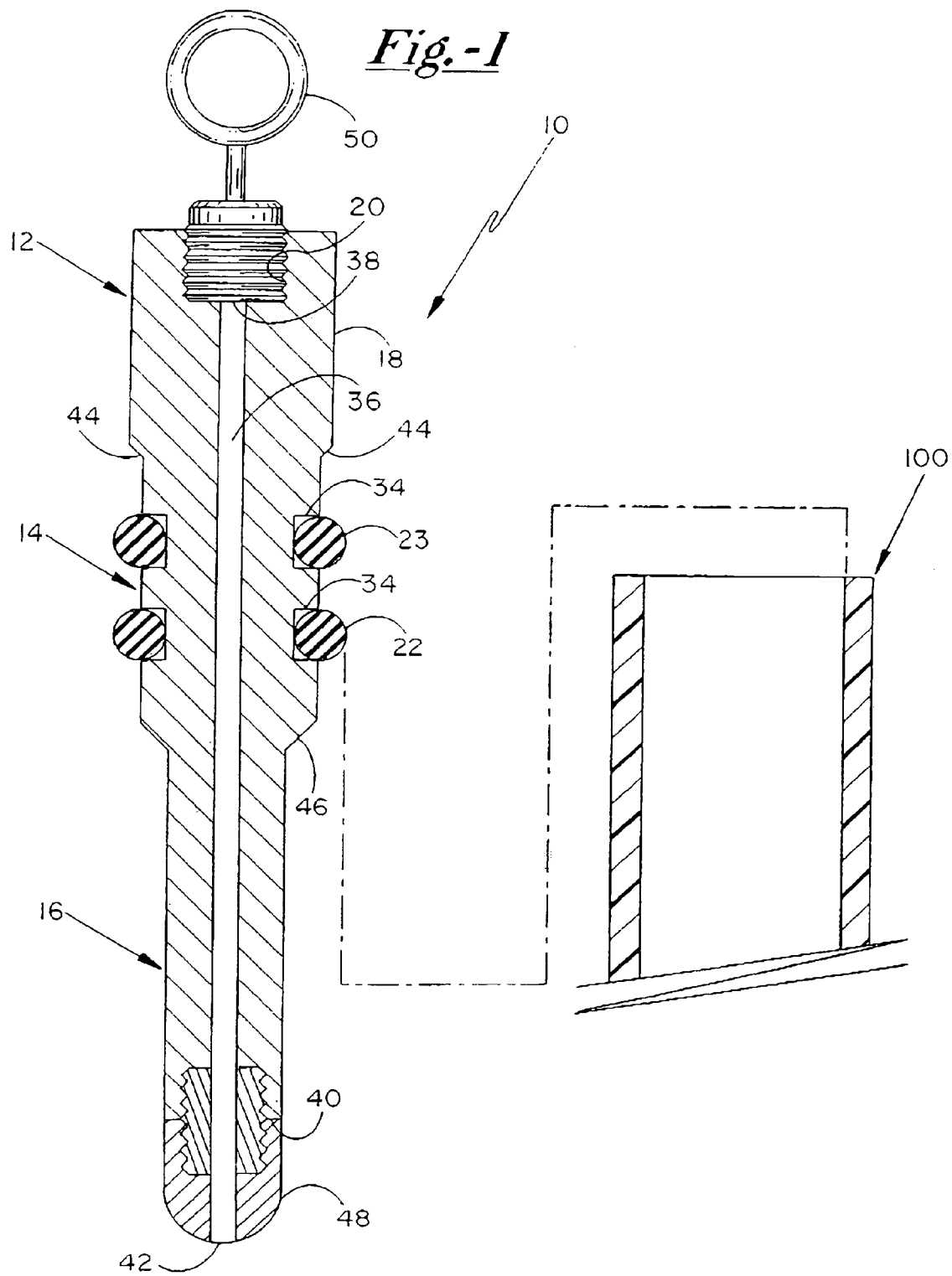
FIG. 1 illustrates a side view of a first embodiment of a pressure test plug in accordance with the present invention.

FIG. 1 illustrates an elongate straightening rod 10 for inserting into a pipe 100, such as of a plumbing system. The elongate straightening rod 10 has an axial dimension having a first end region 12, an opposing second end region 16 and a central region 14 therebetween.

A side wall 18 of the elongate straightening rod 10 defines an outer surface and an inner surface thereof. A receiving cavity 20 is defined by the inner surface of the side wall 18 in the first end region 12 of the elongate straightening rod 10. The cavity 20 is configured to selectively receive one or more functional components, such as the connecting sleeve of a plug handle 50 and/or a pressure coupler (not shown). As shown, the cavity 20 includes a threaded inner surface for receiving a threaded outer surface of the connecting sleeve.

The central region 14 has, preferably, a pair of sealing rings 22, 23 spaced about a circumference of the outer surface of the side wall 18. The side wall 18 may further include one or more recessed channels 34 about the circumference, such that each sealing ring 22, 23 is positioned partially within a corresponding recessed channel 34 defined in the central region 14. The sealing rings 22, 23 are configured to cooperate with the side wall 18 of the elongate straightening rod 10 such that when the elongate straightening rod 10 is received within the inner diameter of a pipe or tube 100 the sealing rings 22, 23 will frictionally engage and contact the inner diameter of the pipe or tube 100, so as to provide a seal between the side wall 18 of the elongate rod 10 and the inner diameter of the pipe or tube 100.

The sealing rings 22, 23 preferably comprise a flexible rubber or rubber-like deformable material, a wide variety of such suitable materials and sealing rings being commonly available in the art.

A pressure lumen 36 is defined within the inner surface of the elongate straightening rod 10. The pressure lumen 36 extends from a first end 38 in the receiving cavity 20 to a second end 40 at an exit port 42 defined in the second end region 16 of the elongate straightening rod 10. The exit port 42 may be in axial alignment with the first end 38 of the lumen 36, or alternatively may be positioned in the side wall 18 such that the lumen 36 may have one or more angled and/or non-linear sections (not shown in the present embodiment).

The elongate straightening rod 10 has a first tapered section 44 located between the first end region 12 and the central region 14. A second tapered section 46 is located between the central region 14 and second end region 16. The outer diameter of the first end region 12 is dimensioned to be less than an outer diameter of the sealing rings 22, 23 positioned about the first region 12 such that the sealing rings 22, 23 engage the inner diameter of the pipe 100 within which the elongate straightening rod 10 is positioned.

The second end region 16 may be configured to receive a selectively attachable extension section 48, for extending the axial dimension of the elongate straightening rod 10.

One use of the elongate straightening rod 10 is in the installation and testing of plumbing systems. For example, the piping/tubing of plumbing systems may comprise cross-linked polyethylene tubing (PEX) or polyvinyl tubing (PVC) or other flexible tubing. The elongate straightening rod may be used to straighten such tubing as it is pulled through and positioned in a concrete flooring and to perform pressure testing on such tubing. The present invention, however, is not limited to use with flexible tubing and may be used in conjunction with more rigid tubing including but not limited to copper, steel, aluminum and other rigid and non-rigid piping and/or tubing.

Figure 2:
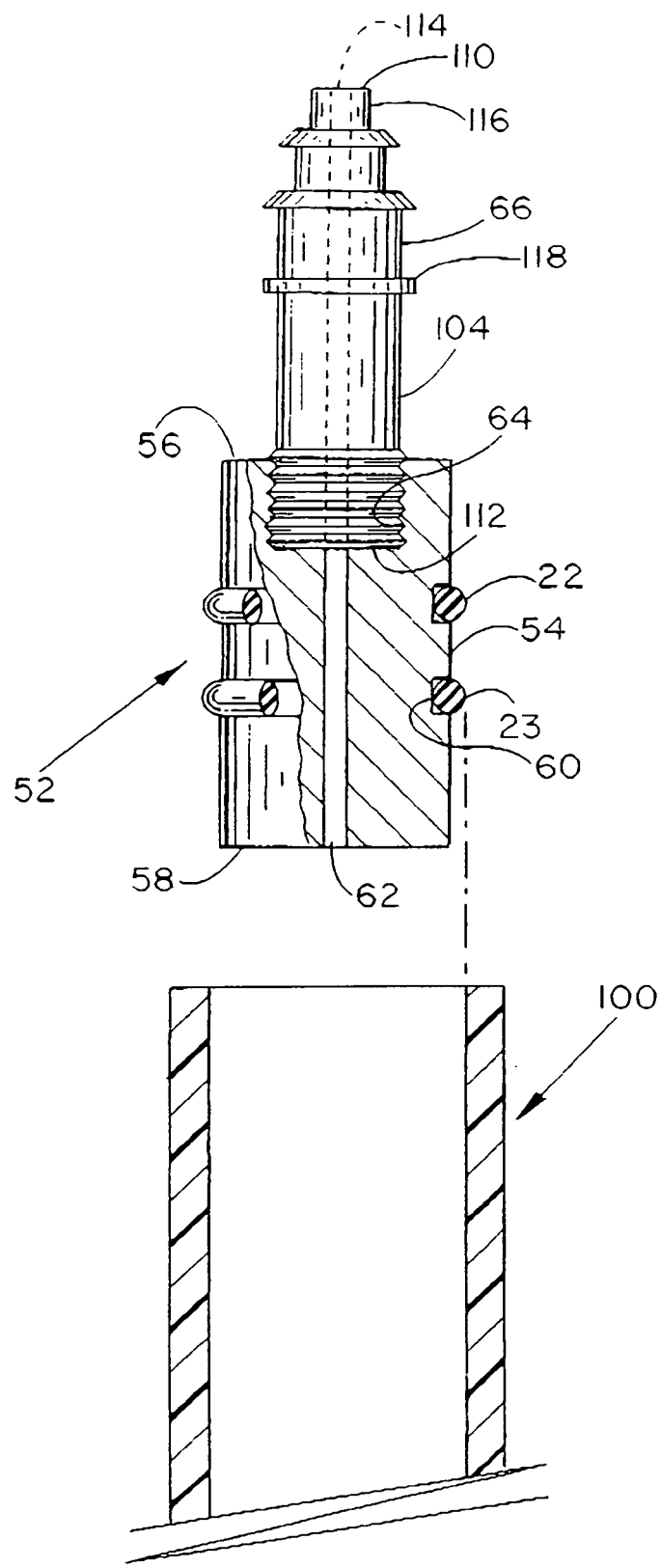
FIG. 2 illustrates a side view of a second embodiment of a pressure test plug in accordance with the present invention.

FIG. 2 illustrates a pressure test plug 52 in accordance with the present invention. The plug 52 has a side wall 54 extending from a first end 56 to a second end 58. A pair of sealing rings 22, 23 extend about the outer surface of the side wall 54 and are configured to sealingly engage the inner diameter of a pipe or tube 100 into which the plug 52 is inserted. The sealing rings 22, 23 may each be received within a separate corresponding channel 60 in the side wall 54. A pressure lumen 62 may extend through the plug 54 from the first end 56 to the second end 58. The first end 56 of the plug 52 has a receiving cavity 64 configured to receive a connecting sleeve of a plug handle (not shown) for sealing the lumen 62, or alternatively the receiving cavity 64 may receive the connecting sleeve of a pressure coupler 66 for pressurizing the tube or pipe 100 in which the plug 52 is inserted.

FIGS. 3 and 4 illustrate a first embodiment of a retainer 70, for maintaining the plug 52 and/or elongate straightening rod 10 within a pressurized pipe or tube 100. The retainer 70 includes, generally, a body 72 having a central aperture 74 and a plurality of retaining arms 76 flexibly suspended from various sections of the periphery of the body 72. The body 72 is dimensioned to fit over the upper lip 106 of the pipe 100 into which the plug 52 or rod 10 is inserted, such that the retaining arms 76 extend outwardly about the outer diameter 108 of the pipe 100.

The retaining arms 76 include tabs 78 at or near the distal ends 80 thereof for frictionally engaging the outer diameter 108 of the pipe 100. The tabs 78 may be lanced tabs, as shown in FIGS. 3 and 4, or alternatively, may be formed by bending the distal ends 80 of the retaining arms 76, as shown in FIG. 5, or any other configuration allowing the tabs 78 to frictionally engage the pipe 100.

The retainer 70 is made of a durable and resilient material such that in a pre-operational orientation the retaining arms 76 are flexibly suspended in an outwardly angled orientation. The retaining arms 76 are flexibly connected to the body 72 such that when received within a slide compressor 82, the retaining arms 76 are urged into an operational configuration, wherein the tabs 78 are in frictional contact with the pipe 100. When the compressor 82 is removed from the retainer 70, the retaining arms 76 resiliently return substantially to the pre-operational orientation with the tabs 78 extending freely outwardly from the body 72 of the retainer 70.

One such suitable material for the retainer 70 is spring steel, but any other durable, resilient material may be utilized in accordance with the present invention.

Figure 6:
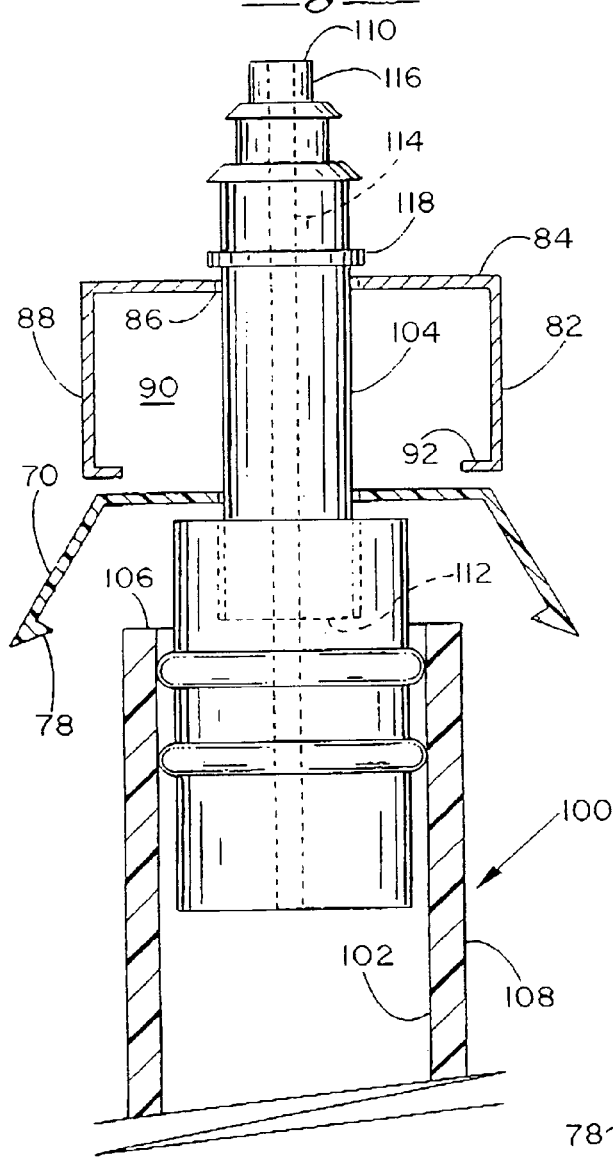
FIG. 6 illustrates a side view of a quick connect mechanism in accordance with the present invention.
Figure 7:
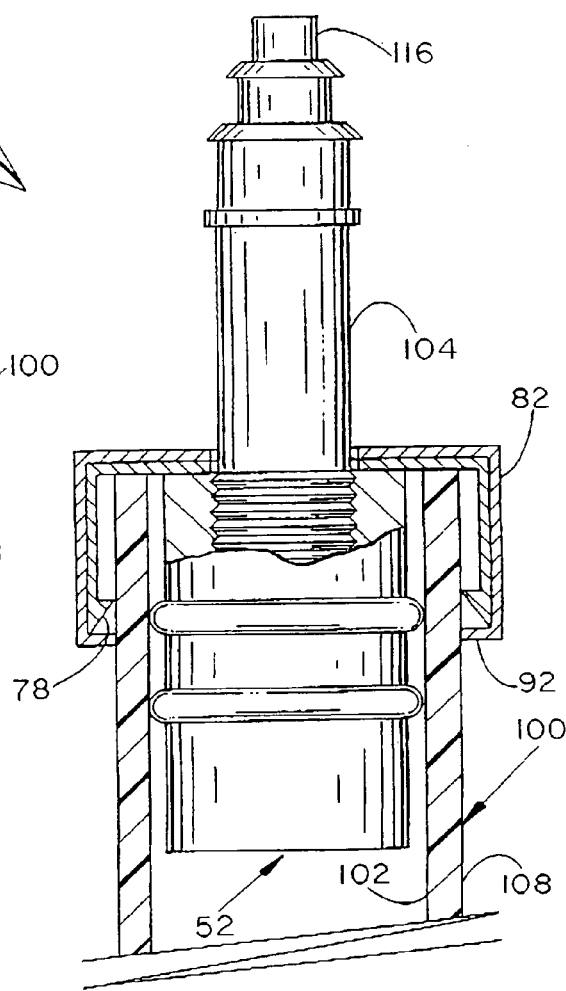
FIG. 7 illustrates a side view of the quick connect mechanism from FIG. 6 in an operational configuration.

FIGS. 6 and 7 illustrate a side view of the present invention in operational use. The plug 52 (or, alternatively, the elongate straightening rod 10) is positioned within the inner diameter 102 of a pipe 100 such that the sealing rings 22, 23 of the plug 52 frictionally engage the inner diameter 102 of the pipe 100.

A pressure coupler 66 is received within the receiving cavity 64 at the first end 56 of the plug 52.

The body 72 of the retainer 70 sits on the first end 56 of the plug 52 such that a connecting sleeve 104 of the pressure coupler 66 extends through the central aperture 74 of the retainer 70. In the orientation shown in FIG. 6, the retaining arms 76 extend outwardly and generally away from the outer diameter 108 of the pipe 100 prior to being received within the slide compressor 82.

The slide compressor 82 is shown having a body section 84 having a central aperture 86 through which the connecting sleeve 104 of the pressure coupler 66 is received. A generally cylindrical side wall 88 extends from the body section 84 to define a cavity 90 for receiving the retainer 70 and pipe section 100 therein. A distal section of the cylindrical side wall 88 may further include a ridge 92 extending inwardly for engaging the distal ends 80 of the retaining arms 76 when the retainer 70 is received within the cavity 90 of the slide compressor 82.

The pressure coupler 66 includes, generally, a first end 110 having a connecting sleeve 104 that is received within the receiving cavity 64 such as via corresponding threading about the connecting sleeve 104. The pressure coupler 66 has a second end 112 which includes a pressure quick connect 116, as is common in the art, for connecting to a pressure source (not shown). A pressure lumen 114 extends from the first end 110 to the second end 112 of the pressure coupler 66. A stop 118 may be positioned around the connecting sleeve 104 to prevent the slide compressor 82 from sliding off of the second end 112 of the pressure coupler 66.

In operation, the plug 52 is inserted into the inner diameter 102 of the pipe 100. The retainer 70 and slide compressor 82 are fitted over the connecting sleeve 104 which is received by the cavity 64 of the test plug 52. The slide compressor 82 is then advanced over the retainer 70, urging the retaining arms 76 inwardly toward the outer diameter 108 of the pipe 100 as the retainer 70 is received within the cavity 90 of the compressor 82. The tabs 78 of the retaining arms 76 are then frictionally engaged with the outer diameter 108 of the pipe 100. The slide compressor 82 receives the retainer 70 and retaining arms 76 therein such that the ridge 92 of the slide compressor 82 engages the distal ends 80 of the retaining arms 76.

The pressure coupler 66 may then be connected to a pressure source to test and/or pressurize the pipe 100 and/or plumbing system.

Figure 8:
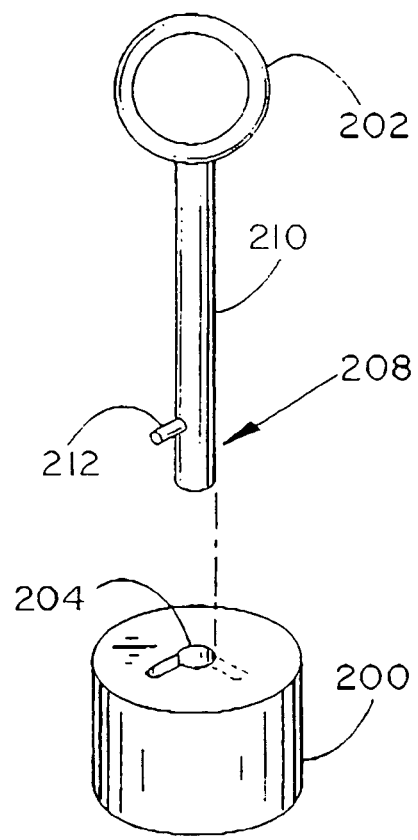
FIG. 8 illustrates a side view of a connecting sleeve in accordance with the present invention.
Figure 9:
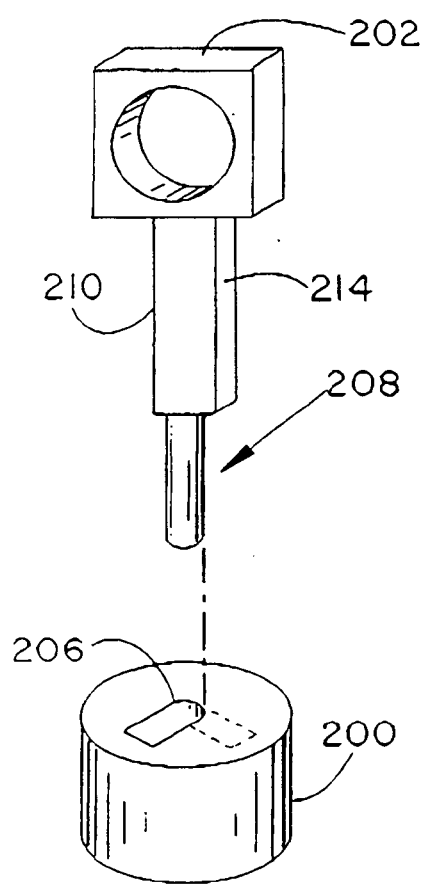
FIG. 9 illustrates a side view of an alternative embodiment of a connecting sleeve in accordance with the present invention.

FIGS. 8 and 9 illustrate alternative embodiments of a slide compressor 200 and plug handle 202 combination in accordance with the present invention.

The slide compressor 200 may have a central aperture having a non-uniform boundary such as the generally keyhole shaped aperture 204 in FIG. 8 or the generally elongate aperture 206 in FIG. 9. In each case, a portion of the connecting sleeve 208 of the plug handle 202 has a body section 210 extending therefrom that correspondingly fits through a portion of the aperture 204, 206 of the slide compressor 200. When the slide compressor 200 is positioned intermediately over the connecting sleeve 208, the body section 210 is received through the aperture 204, 206. When the slide compressor 200 is operably positioned over the retainer 70 for pressure testing, the connecting sleeve 208 is rotated such that the body section 210 operates as a stop on the compressor 200 such that the compressor 200 is prevented from sliding upwardly along the connecting sleeve 208.

The body section 210 of the plug handle 202 may take any number of forms and configurations such as the extension 212 in FIG. 8 or the elongate body 214 in FIG. 9.

Figure 10:
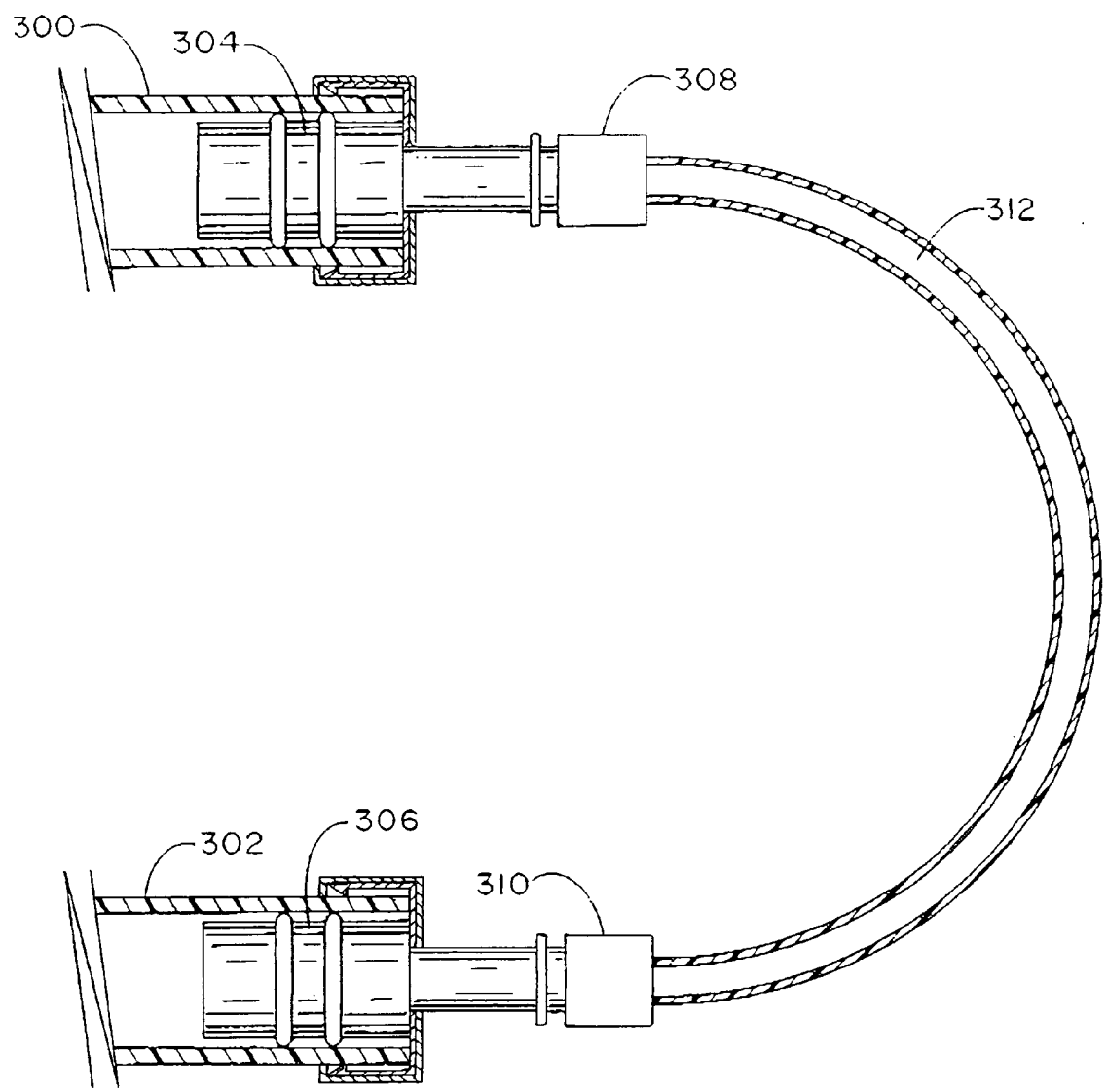
FIG. 10 illustrates an embodiment of the present invention for pressure testing of hot and cold water pipe lines.

FIG. 10 provides an additional method for using the present invention for pressure testing hot and cold water pipes 300, 302 in a plumbing system, either individually or simultaneously. A first plug 304 is positioned in the hot water pipe 300, a second plug 306 is positioned in the cold water pipe 302. Each plug 304, 306 has a pressure coupler 308, 310 connected thereto and a tubing 312 connects the first and second plugs 304, 306 to each other. Thus, the hot and cold water pipes 300, 302 are in fluid communication with each other. Alternatively, one or both pipes 300, 302 may be plugged by interchanging one or both of the pressure couplers 308, 310 with a plug handle 202.

The various embodiments of the present invention are intended to be illustrative and not limiting. It is understood that any number of combinations and configurations may be utilized within the scope and spirit of the present invention.

What is claimed is:

1. An apparatus for pressure testing of a plumbing system comprising:
   a) an elongate straightening rod;
   b) a retainer disposed over a top edge of a pipe in said pluming system and having a plurality of retaining arms disposed about an outer surface of the pipe; and
   c) a slide compressor disposed to receive said retainer therein whereby said retaining arms frictionally engage the outer surface of the pipe.

2. The apparatus from claim 1 wherein two sealing rings extend about said elongate straightening rod.

3. The apparatus from claim 2 further comprising a first tapered section between a first end region and a central region of said elongate straightening rod.

4. The apparatus from claim 3 further comprising a second tapered section between said central region and a second end region of said elongate straightening rod.

5. The apparatus from claim 4 further comprising an extension section selectively attachable to said second end region of said elongate straightening rod.

6. The apparatus from claim 5 wherein said elongate straightening rod further comprises a receiving cavity in said first end region.

7. A retainer mechanism for frictionally engaging an outer wall of a pipe, said retainer mechanism comprising:
   a) a body having a central aperture extending therethrough, said body configured to fit over a top edge of the pipe;
   b) a plurality of retaining arms flexibility extending from said body, said plurality of retaining arms being compressible inwardly towards the outer wall of the pipe; and
   c) each of said plurality of retaining arms having a gripping tab at a distal end thereof for frictionally engaging the outer wall of the pipe.

8. The retainer mechanism from claim 7 wherein said gripping tab is a lanced tab.

9. The retainer mechanism from claim 7 wherein said gripping tab is formed by inwardly bending said distal end of said plurality of retaining arms.

10. The retainer mechanism from claim 7 further comprising an elongate straightening rod received within an inner wall of the pipe.

11. The retainer mechanism from claim 10 wherein said elongate straightening rod has a pair of sealing rings for frictionally engaging the inner wall of the pipe.

12. System for pressure testing of a pipe network, said system comprising"
   a) a plug having a pressure lumen extending from a receiving cavity in a first end region to an exit port at an opposing second end region, said plug further comprising a pair of sealing rings extending around a central region thereof configured to sealingly engage an inner diameter of a pipe;
   b) a retainer positionable over an end of the pipe, said retainer having a body with a central aperture extending therethrough and a plurality of retaining arms operably configured to flexibly suspend from said body about an outer diameter of the pipe;
   c) a pressure coupler having a connecting sleeve at a first end, said connecting sleeve being received in said receiving cavity and extending through said aperture of said retainer, said connection sleeve having a second end configured to be couplable to a pressure source; and
   d) a slide compressor received over said connecting sleeve, said slide compressor having a cylindrical side wall configured to urge said retaining arms into frictional contact with the outer diameter of the pipe.

13. The system from claim 12 wherein said second end of said pressure coupler is couplable to a pressure source by a quick-connect mechanism.

14. The system from claim 13 wherein said pressure coupler further comprises a stop positioned on said connecting sleeve.

15. A system for temporarily plugging a pipe, said system comprising:
   a) a tubular body received by an inner diameter of the pipe;
   b) a pair of sealing rings extending around an outer surface of said tubular body to provide a pressure seal between said outer surface of said tubular body and the inner diameter of the pipe;
   c) a retainer having a plurality of retaining arms suspended therefrom, said retainer being positionable over an end of the pipe; and
   d) a slide compressor receivable over said retainer and capable of causing said plurality of retaining arms to frictionally engage an outer diameter of the pipe.

16. The system in accordance with claim 15 wherein said tubular body further comprises a receiving cavity in a first end section thereof.

17. The system in accordance with claim 16 wherein a plug handle is received in said receiving cavity.

18. The system in accordance with claim 17 wherein said plug handle has a connecting sleeve about which said retainer and said slide compressor are received.

19. The system in accordance with claim 18 wherein said connecting sleeve has a body section extending from a portion thereof.

20. The system in accordance with claim 19 wherein said slide compressor has a non-uniform shaped aperture.

21. The system in accordance with claim 20 wherein said body section is receivable through said non-uniform shaped aperture when positioned and rotated in a first orientation.

22. The system in accordance with claim 21 wherein said body section acts as a stop when positioned and rotated to a second orientation with respect to said slide compressor.

* * * * *